United States Patent Office 3,249,583
Patented May 3, 1966

3,249,583
STABILIZATION OF POLYPROPYLENE WITH A ZINC DIALKYLDITHIOCARBAMATE AND A TRIHYDROXYACYLPHENONE
Clarence E. Tholstrup, Kingsport, Tenn., assignor to Eastman Kodak Company, Rochester, N.Y., a corporation of New Jersey
Filed Dec. 15, 1961, Ser. No. 159,784
2 Claims. (Cl. 260—45.75)

This invention relates to the process and product resulting from the stabilization of polypropylene and other poly-α-olefins utilizing a synergistic combination of a zinc dialkyldithiocarbamate and either (1) an alkylated phenol, (2) an alkylidenebisphenol, or (3) a trihydroxyphenylketone.

Discussion of the problems involved in this art is set forth in U.S. 2,965,606 and U.S. 3,001,969. The polymer particularly concerned herein is polypropylene such as can be made by polymerization processes using a partially reduced, heavy transition metal compound as explained in U.S. 2,965,606. Thus, the stabilizer combination of this invention is effective in polypropylene containing small amounts of reduced catalyst residues, e.g. from catalysts that were prepared by (1) reacting aluminum triethyl with $TiCl_3$, (2) reacting ethyl aluminum sesquichloride with $TiCl_3$ and hexamethylene phosphortriamide, (3) reacting lithium aluminum hydride with $TiCl_3$, et cetera. Such polypropylene compositions usually contain at least about 0.001 percent ash upon analysis. The present invention is quite effective for such polypropylenes that contain 0.02 percent ash or even more, e.g., 0.2 percent ash.

It is an object of this invention to provide stabilized solid polypropylene and a process for achieving such stability. It is a further object to achieve this purpose by providing a synergistic combination of a zinc dialkyldithiocarbamate and either (1) an alkylated phenol, (2) an alkylidenebisphenol, or (3) a trihydroxyphenylketone. Other objects are apparent from this specification.

In one embodiment this invention provides, in a method of stabilizing against oxidative and thermal degradation an α-olefin solid polypropylene polymer containing in excess of about 0.001 percent by weight of catalyst residues, the improvement which comprises incorporating in the polymer a synergistic combination of a minor amount of both (1) a zinc dialkyldithiocarbamate wherein each alkyl radical contains from 3 to 20 carbon atoms and (2) a member selected from the group consisting of (a) an alkylated phenol, (b) an alkylidenebisphenol and (c) a trihydroxyphenylketone, each of these components (1) and (2) being utilized in an amount of from about 0.01 to about 2.0 weight percent based on the polymer.

According to this embodiment of the invention there is provided a composition of matter comprising a solid α-olefin, low pressure polypropylene polymer containing in excess of about 0.001 percent by weight of catalyst residues, admixed with a synergistic combination of a minor amount of both (1) a zinc dialkyldithiocarbamate wherein each alkyl radical contains from 3 to 20 carbon atoms and (2) a member selected from the group consisting of (a) an alkylated phenol, (b) an alkylidenebisphenol and (c) a trihydroxyphenylketone, each of these components being utilized in an amount of from about 0.01 to about 2.0 weight percent based on the polymer.

The low pressure process for preparing such low pressure polymers is well known in the art as explained in Belgian Patent 538,782, in the Scientific American, September 1957, pages 98 et seq., and elsewhere. The catalyst systems as illustrated hereinabove and in the prior art cited herein include insoluble reaction products obtained by partially reducing a reducible, heavy transition compound of a group IV-B, V-B, VI-B or VIII metal, e.g., Ti or V halides, with a reducing group I to III metal-containing material such as an organometallic compound of an alkali metal, an alkaline earth metal, a rare earth metal, zinc or the like. Monomeric propylene can be polymerized in an inert hydrocarbon solvent such as xylene, isopentane, hexane, heptane, etc., at a pressure of 0 to 500 p.s.i.g., at a temperature of 0° to 100° C. using a catalyst concentration of 0.1 to 0.5 percent based on the reaction mixture including the solvent. When the desired polymerization has been achieved, an alkanol can be added and the precipitated polymer removed by filtration and washed. Such processes, as already mentioned, are well known in the art and are subject to considerable variation. The polymers produced, such as solid polypropylene, have a high degree of crystallinity and molecular weights from well below 50,000 up into the millions. The processes referred to cover not only the polymerization of propylene but also pentene-1, 3-methylbutene-1, 4-methylpentene-1, 3,3 - dimethylbutene - 1, butene - 1, and other polymerizable α-mono-olefins. The most advantageously useful of these at the present time is propylene from which is prepared the above-described solid polypropylene by a low pressure process.

The zinc dialkyldithiocarbamates which can be employed include those wherein each alkyl radical contains from 3 to 20 carbon atoms, e.g., propyl, butyl, isobutyl, hexyl, decyl, octadecyl, etc. The alkyl radicals need not be the same. The most readily available is the dibutyl compound known as Butyl Zimate. Various alkylated phenols which can be employed include 2,6-di-t-butyl-p-cresol which is abbreviated BHT, 2,6-didodecyl-p-cresol, 2,6-bis-(1-methylheptadecyl)-p-cresol and other related compounds, especially the 2,6-dialkyl-p-cresols wherein the alkyl radicals can be the same or different and contain from 3 to 20 carbon atoms as illustrated above.

Various alkylidenebisphenols which can be employed include 4,4'-butylidenebis-(6-t-butyl-m-cresol), 2,2'-methylenebis[6-(1-methylcyclohexyl)-p-cresol], which is abbreviated MBC, and other related compounds, especially alkylidenebis(6-alkylated cresols) wherein the alkylidene radical contains from 1 to 6 carbon atoms and each alkyl radical contains from 1 to 8 carbon atoms.

Various trihydroxyphenylketones which can be employed include 2,4,5-trihydroxybutyrophenone which can be abbreviated THBP, 2,4,5-trihydroxystearrophenone which can be abbreviated THSP, and other related compounds, especially the 2,4,5-trihydroxyacylphenones wherein the acyl radical contains from 2 to 18 carbon atoms.

Stabilized polypropylene can be prepared by dissolving the additives in a solvent such as acetone, coating particles of the polymer with this solution and drying so as to remove the solvent. The dried particles can then be used to mold specimens for such test purposes as illustrated in Table 1A and Table 1B below.

Stabilized polypropylene can also be prepared by mixing the additives into the polymer on hot mill rolls. In Table 2 below this was done for 6 minutes; the milled polymer was then granulated and injection molded to form the test specimens used.

Other methods for incorporating the additives into the polymer are also self-evident to those skilled in the art.

The amount of additives which can be advantageously employed depends upon the degree of stability desired, the amount of deleterious residues in the polymer to be stabilized, etc. It is considered that 4 percent by weight (sum of both synergistic additives) would be the maximum probably required for preventing degradation under severe conditions. In many instances, as little as 0.01 percent of each additive will be adequate to prevent oxidative and thermal degradation. Generally, any one of the additives is used in an amount no more than three times the weight of any other additive. Usually, equal weight proportions are advantageous. Other additives such as pigments, additional ultraviolet light inhibitors, dyes, etc. can also be present.

The test data in the tables below will serve to further illustrate this invention. The tests performed were as described in U.S. Patent 3,001,969, column 5, line 25, to column 6, line 12.

*Table 1A*

Additives in polypropylene:  Heat stability data at 140° C., oven life (hrs.)
1. Control ------------------------------------- 0.2
2. 1.0% BHT --------------------------------- 8
3. 0.5% MBC --------------------------------- 27
4. 0.2% MBC --------------------------------- 14
5. 0.5% THBP -------------------------------- 10
6. 0.5% Butyl Zimate ------------------------- 6
7. 0.2% Butyl Zimate ------------------------- 3
8. 0.25% Butyl Zimate+0.25% BHT ---------- 4
9. 0.25% Butyl Zimate+0.25% MBC ---------- 25
10. 0.5% Butyl Zimate+0.5% THBP ----------- 27
11. 0.25% Butyl Zimate+0.25% THBP --------- 17

In the above table BHT is 2,6-di-t-butyl-p-cresol; MBC is 2,2'-methylenbis[6-(1-methylcyclohexyl)-p-cresol]; and THBP is 2,4,5-trihydroxybutrophenone. The polypropylene had a melt index of 0.08 at 190° C./1.9 kg. and somewhat more than 0.02 percent ash upon analysis. The same type polypropylene was used in Table 1B.

*Table 1B*

Additives in polypropylene:  Heat stability data at 160° C., oven life (hrs.)
1. Control ------------------------------------- 0.2
2. 0.05% Butyl Zimate ------------------------ 3
3. 0.025% Butyl Zimate ----------------------- 1
4. 0.1% S-P --------------------------------- 12
5. 0.05% S-P -------------------------------- 5
6. 0.05% Butyl Zimate+0.05% S-P ------------ >50

In the above table S-P represents 4,4'-butylidenebis-(6-t-butyl-m-cresol). In item 6 the test was discontinued after 50 hours; hence the maximum life was not determined.

and contained less than 0.01 percent ash upon analysis. The CDM ratings were obtained as described in ASTM Procedure D-1365-55T.

The utility of this invention for stabilizing polypropylene monofil compositions is illustrated by tests conducted on monofils having the following compositions:

| Components | Percent by weight in each Composition | | | |
|---|---|---|---|---|
| | A | B | C | D |
| 1. Polypropylene having an I.V. of 1.4 | 98.5 | 97.0 | 98.0 | 96.5 |
| 2. B-Z | 0.25 | 0.25 | 0 | 0 |
| 3. S-P | 0.25 | 0.25 | 0 | 0 |
| 4. U-V inhibitor | 1.0 | 1.0 | 1.0 | 1.0 |
| 5. TiO$_2$ pigment | 0 | 1.5 | 0 | 1.5 |
| 6. S-R | 0 | 0 | 1.0 | 1.0 |

The U-V inhibitor was 4-dodecyloxy-2-hydroxy-benzophenone; S-R is 4,4'-thiobis(6-t-butyl-m-cresol).

The following data were obtained from tests performed upon these monofil compositions:

| Monofil | Strength (p.s.i.) | Percent Stress to Break |
|---|---|---|
| A | 214 | 21.8 |
| B | 191 | 22 |
| C | 143 | 14 |
| D | 166 | 17.8 |

Thus, the use of 1.0 percent of S-R, a well-known commerical stabilizer does not give nearly as good results in regard to monofils C and D, as does the use of only half as much of the synergistic combination of this invention as illustrated by monofils A and B.

*Table 2*

| Additives in Polypropylene | Color Rating of Molded 2 x 2 x 1/16 inch plates; CDM rating | | | | Heat Stability Data, Oven Life in Hrs. at— | |
|---|---|---|---|---|---|---|
| | Rd | a | b | Visual | 160° C. | 140° C. |
| 1. Control | 73.6 | −0.3 | +4.0 | White | 1 | 2 |
| 2. 0.05% B-Z | | | | do | 20 | 100 |
| 3. 0.1% B-Z | | | | Lt. Tan | 70 | 200 |
| 4. 0.5% B-Z | 74.2 | −1.7 | +7.0 | Lt. Yell | 210 | 400 |
| 5. 0.05% BHT | | | | White | 1 | |
| 6. 0.1% BHT | | | | do | 2 | 20 |
| 7. 0.5% BHT | 74.8 | −1.1 | +3.9 | do | 6 | 40 |
| 8. 0.05% S-P | | | | do | 12 | 60 |
| 9. 0.1% S-P | | | | do | 15 | 100 |
| 10. 0.5% S-P | 74.2 | −1.1 | +4.9 | Off White | 20 | 140 |
| 11. 0.05% B-Z +0.1% BHT | | | | Tan | 65 | 220 |
| 12. 0.1% B-Z +0.1% BHT | | | | do | 110 | 270 |
| 13. 0.25% B-Z +0.25% BHT | 73.9 | −1.4 | +5.6 | do | 220 | 260 |
| 14. 0.5% B-Z +0.5% BHT | 73.5 | −1.2 | +5.2 | do | 245 | 400 |
| 15. 0.05% B-Z +0.05% S-P | | | | do | 70 | 220 |
| 16. 0.1% B-Z +0.1% S-P | | | | do | 100 | 300 |
| 17. 0.25% B-Z +0.25% S-P | 75.3 | −1.6 | +6.2 | do | 270 | 400 |
| 18. 0.5% B-Z +0.5% S-P | 72.8 | −1.3 | +6.0 | do | 315 | 520 |

In Table 2, B-Z represents Butyl Zimate. The polypropylene tested above had a density of 0.91, an I.V. at 145° C. of 1.85, a melt flow of 1.5 at 230° C./2.6 kg.

The following table illustrates the effect of ageing the above monofils in a dry Weather-Ometer (Atlas Devices) where the accelerated effects of simulated sunlight are analogous to natural exposure to sunlight over a long period of time:

Table 3

| Period of Exposure and Property tested | Monofil and Percent of Original Property retained | | | |
|---|---|---|---|---|
| | A | B | C | D |
| Aged 600 hrs.: | | | | |
| Strength, p.s.i. | 74 | 66 | 50 | 43 |
| Percent Stress to break | 55 | 50 | 40 | 37 |
| Color | White | White | Yellow | Yellow |
| Aged 1,000 hrs.: | | | | |
| Strength, p.s.i. | 50 | 48 | 22 | 17 |
| Percent Stress to break | 44 | 42 | 29 | 20 |
| Color | White | White | Yellow | Yellow |

The polypropylene used in the tests for Tables 1A and 1B was made using a catalyst prepared by reacting aluminum triethyl with $TiCl_3$. As to Tables 2 and 3 the catalyst was prepared by reacting lithium aluminum hydride with $TiCl_3$.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A composition of matter comprising a solid α-olefin, low pressure polypropylene polymer containing in excess of about 0.001 percent by weight of catalyst residues containing at least one metal selected from the group consisting of the heavy transitional metals of periodic table groups IV–B, V–B, VI–B and VIII; admixed with a synergistic combination of a stabilizing amount of both (1) a zinc dialkyldithiocarbamate wherein each alkyl radical contains from 3 to 20 carbon atoms and (2) a 2,4,5-trihydroxyacylphenone wherein the acyl radical is composed of one carbonyl group attached to a hydrocarbon group and said acyl radical contains from 2 to 18 carbon atoms, each of components (1) and (2) being utilized in an amount of from about 0.01 to about 2.0 weight percent based on the polymer.

2. A composition as defined in claim 1 wherein component (1) is zinc dibutyldithiocarbamate and component (2) is 2,4,5-trihydroxybutyrophenone.

References Cited by the Examiner

UNITED STATES PATENTS

| 2,755,272 | 7/1956 | Lambert et al. | 260—45.75 XR |
| 2,765,292 | 10/1956 | Groff et al. | 260—45.75 XR |
| 2,843,563 | 7/1958 | Bell et al. | 260—45.95 |
| 2,965,606 | 12/1960 | Ford et al. | 260—45.75 |
| 2,972,596 | 2/1961 | Newland et al. | 260—45.75 |
| 2,980,645 | 4/1961 | Newland et al. | 260—45.75 |
| 2,983,710 | 5/1961 | Tholstrup et al. | 260—45.75 XR |
| 2,985,617 | 5/1961 | Salyer et al. | 260—45.7 |
| 3,028,363 | 4/1962 | Robbins et al. | 260—45.95 XR |
| 3,030,333 | 4/1962 | Coppinger | 260—45.95 XR |

FOREIGN PATENTS

| 587,296 | 2/1960 | Belgium. |
| 1,277,190 | 10/1961 | France. |
| 929,435 | 6/1963 | Great Britain. |

DONALD E. CZAJA, *Primary Examiner.*

JOSEPH R. LIBERMAN, LEON J. BERCOVITZ,
*Examiners.*